June 29, 1954 G. H. TRIPP 2,682,413
CHUCK
Filed June 12, 1952 2 Sheets-Sheet 1
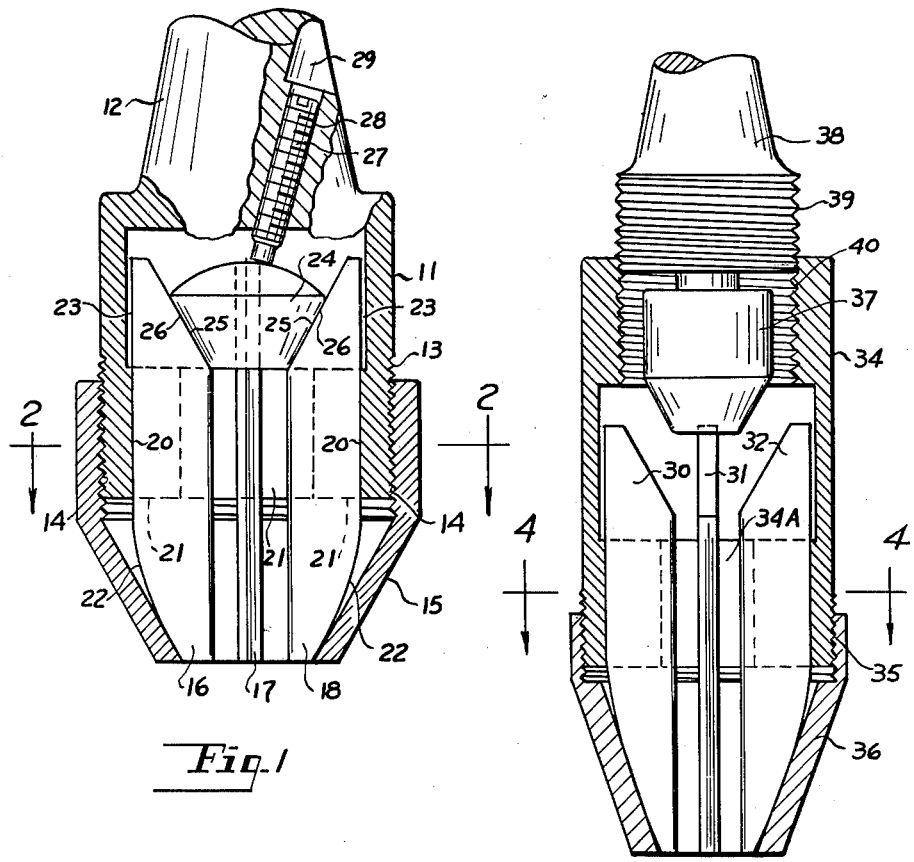
Fig.1
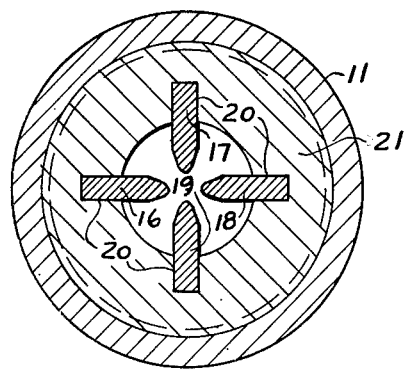
Fig.2
Fig.3
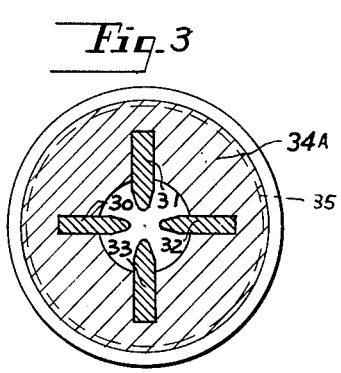
Fig.4
INVENTOR.
GUY H. TRIPP.
BY Edward M. Apple
ATTORNEY.

June 29, 1954
G. H. TRIPP
2,682,413
CHUCK
Filed June 12, 1952
2 Sheets-Sheet 2
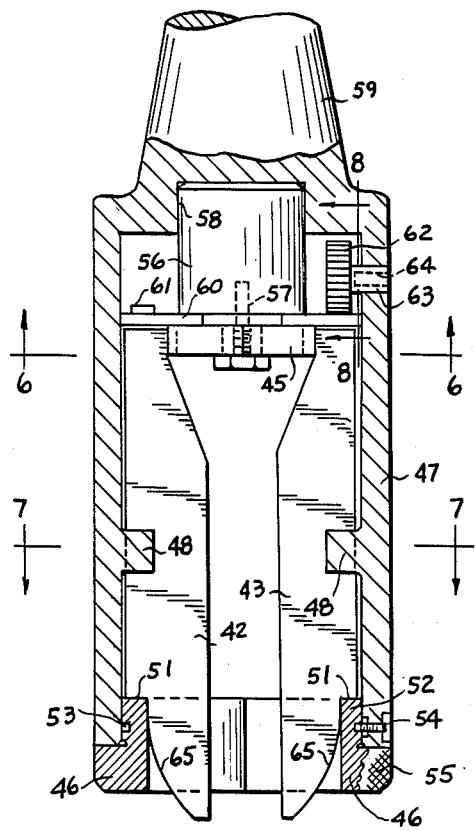
Fig.5
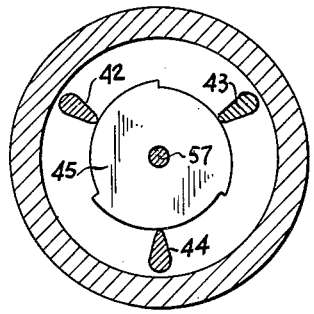
Fig.6
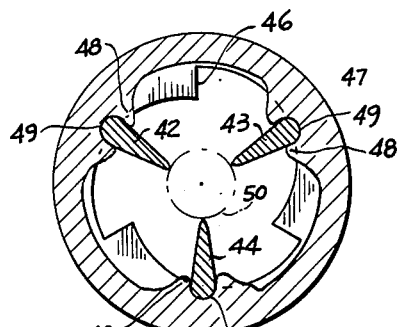
Fig.7
Fig.8
INVENTOR.
GUY H. TRIPP.
BY Edward M. Apple
ATTORNEY.

Patented June 29, 1954

2,682,413

UNITED STATES PATENT OFFICE 2,682,413

CHUCK

Guy H. Tripp, Detroit, Mich.

Application June 12, 1952, Serial No. 293,105

7 Claims. (Cl. 279—56)

This invention relates to chucks for use with drill reamers and the like.

An object of the invention is to generally improve devices of the character indicated, and to provide a self-centering chuck for drilling straight and tapered shanks.

Another object of the invention is to provide a chuck having a plurality of jaws which are arranged for radial and axial adjustment preliminary to the initial gripping of the drill or reamer shank, with a subsequent and final gripping accomplished with a lever action of the jaws.

Another object of the invention is to provide a drill chuck which is constructed and arranged so that there is a comparatively light gripping action accomplished by the jaws with a subsequent and final clamping and tightening of the jaws accomplished by employing the jaws as levers.

Another object of the invention is to provide a chuck having jaws which are constructed and arranged so that they effect a cocking action on the periphery of the drill or reamer shank.

Another object of the invention is to provide a drill chuck which is constructed and arranged so that it will firmly and tightly hold the center drill shank, although only a small bite is taken at the end of the shank.

The foregoing and other objects and advantages of the invention will become more apparent as the description proceeds, reference being made from time to time to the accompanying drawing forming part of the within disclosure, in which drawing:

Fig. 1 is vertical section, with parts broken away, taken through a drill chuck embodying the invention.

Fig. 2 is a section taken substantially on the line 2—2 of Fig. 1.

Fig. 3 is a sectional view taken through a drill chuck embodying the invention, but with different means employed for radially and axially moving the jaws.

Fig. 4 is a section taken substantially on the line 4—4 of Fig. 3.

Fig. 5 is a further modified form of the device embodying the invention.

Fig. 6 is a section taken substantially on the line 6—6 of Fig. 5.

Fig. 7 is a section taken substantially on the line 7—7 of Fig. 5.

Fig. 8 is a section taken substantially on the line 8—8 of Fig. 5.

Although I have herein disclosed certain structural means for effecting the radial and axial movement of the chuck jaws, it will be understood that other means which are the mechanical equivalent of the means herewith disclosed, will be employed with equal facility, all of which are within the contemplation of the invention.

Referring now more particularly to the drawing, it will be understood that in the embodiment herein disclosed, the reference character 11 (Fig. 1) indicates the cylindrical body of the chuck which terminates in a shank 12, which may be received in a drill press, or the like. The body 11 is provided with external threads 13, which are engaged by the internal threads 14 of a truncated conical nut 15, all of which elements are old in the art, and are only significant in the invention when combined with the other elements hereinafter described.

Mounted on the inside of the housing 11 is a plurality of jaws 16, 17, 18, and 19, which jaws are mounted for radial and axial movement in the radial slots 20 formed in the flange 21, integrally formed on the inside central portion of the body 11.

It will be noted that the jaws 16, 17, 18, and 19 have curved edges, as at 22, in contact with the inside walls of the nut 15 which serve to function in the final lever action of the jaws as hereinafter explained.

The radial slots 20 are of such depth that there is normally a clearance, as at 23, between the jaws 16, 17, 18, and 19, and the upper walls of the housing 11. This permits the final outward radial adjustment of the upper ends of the jaws and the final inward radial movement of the lower ends of the jaws, to effect the final tightening and gripping action of the jaws through the leverage action effected between the curves 22 and the side walls of the nut 15.

The radial and axial movement of the jaws 16, 17, 18, and 19 is effected by means of a truncated conical wedge block 24, the side walls 25 of which are arranged to ride on the inclined faces 26 of the jaws 16, 17, 18, and 19. Final pressure is exerted on the wedge block 24 by means of an Allen head screw 27, which threadedly engages a suitable bore 28 formed in the shank portion 12 of the housing 11. Access to the screw 27 may be had through a cut-out portion 29.

In operation the device functions as follows:

When a drill shank is inserted between the lower ends of the jaws 16, 17, 18, and 19 a preliminary tightening of the jaws is effected by tightening the nut 15 on the threads 14 as in conventional practice. The subsequent and final gripping, centering and tightening action is accomplished when pressure is exerted on the wedge block 24 through the screw 27. As the pressure is increased on the wedge block 24, the upper ends of the jaws 16, 17, 18, and 19 are moved radially outwardly a minute fraction of an inch, which outward radial movement of the upper ends of the jaws 16, 17, 18, and 19 causes a corresponding inwardly radial movement of the lower ends of the jaws in a lever action, in which the fulcrum point is the point of contact between the curved surfaces 22 of the jaws and the walls of the nut 15.

Thus it may be seen that I accomplish a preliminary and normal gripping action by the jaws when the latter are brought together by the upward movement of the nut 15, and I accomplish a final and positive locking and gripping action through the final leverage operation of the jaws as hereinabove described.

In Figs. 3 and 4, I illustrate a modified form of means for effecting the final lever action on the jaws 30, 31, 32, and 33. In this embodiment the housing 34 is provided with threads 35 and a truncated conical nut 36, as previously described. The housing 34 is also provided with an internal flange 34A, which is slotted to receive the jaws, as previously described. But in this embodiment, the wedge block 37 is formed as an integrated part of the shank 38, which is externally threaded, as at 39, to engage an internally threaded bore 40, formed on the upper portion of the housing 34. In this embodiment, the initial tightening is accomplished by means of the nut 36 and the final lever action of the jaws 30, 31, 32, and 33 is accomplished by tightening the housing 34 on the threaded shank 39. Otherwise, the device functions as previously described in Figs. 1 and 2.

In Figs. 5, 6, 7 and 8, I show a still further modified form of the invention, which accomplishes the same results as hereinbefore indicated. In this embodiment, I employ cams inside of the wedge block or truncated nut to effect the radial and axial movement of the jaws 42, 43, and 44. The cam 45 is employed to effect the outward radial movement of the upper walls of the jaws, and the cam ring 46 is arranged to effect the inward radial movement of the lower walls of the jaws 42, 43, and 44. In this modification, the housing 47 is provided with inwardly extending bosses 48 which are provided with grooves 49, in which the jaws are mounted. The grooves 49 permit the jaws 42, 43, and 44 to rotate axially a limited number of degrees, so that the sharp edges of the jaws may effect a cocking action on the drill shank 50, as the latter is initially rotated in the jaws. The jaws 42, 43, and 44 have shoulders 51 formed thereon, which shoulders are adapted to rest upon the cam ring 46 to prevent their falling out of the housing 47. The cam ring 46 is provided with a reduced portion 52 which extends through the housing 47. The reduced portion 52 is provided with a peripheral slot 52, which is adapted to receive a set screw 54 which is carried in a threaded bore formed in the wall of the housing 47. The cam ring 46 is preferably knurled, as at 55, so that it may be grasped in the hand and be easily rotated.

The cam member 45 is secured to a hub 56, by means of a machine screw 57, and the hub 56 engages a recess 58 formed in the shank 59. Interposed between the cam 45 and the hub 56 is a ring gear 60, the teeth 61 of which engage a pinion gear 62, which is mounted on a pivot 63, which is rotatable by means of an Allen wrench or the like, which may be inserted in the socket 64. The cam 45 has cam surfaces, as shown in Fig. 6, which are arranged to ride against the inside edges of the upper ends of the jaws 42, 43, and 44, whereby the jaws are moved radially outwardly when the cam 45 is rotated. The lower ends of the jaws 42, 43, and 44 are correspondingly moved inwardly under the influence of the cam surfaces formed on the inner periphery of the cam ring 46. The jaws 42, 43, and 44 are provided with curved edges 65, which function in the manner previously described in the description of Figs. 1 and 2. The basic operation of the device is the same in the structure shown in Fig. 1 as well as in the modifications shown in the other figures, so that a description of the operation of the structure of Fig. 1 will suffice for all.

In using the device shown in Fig. 1, the tool to be held is inserted in the opening at the lower end of the device between the jaws 16, 17, and 18. The nut 15 is then rotated on the body 11, which rotation causes the lower ends of the jaws 16, 17, and 18 to move radially into gentle contact with the tool to be held (not shown). In addition to the inward radial movement of the lower ends of the jaws 16, 17, and 18, there is a slight upward axial movement because of the curved surfaces 22. The upward axial movement of the jaws is arrested by the contacting of the faces 26 of the jaws with the face 25 formed on the wedge block 24. As the rotation of the nut 15 continues, the jaws 16, 17 and 18 will be brought into gripping contact with the tool, with sufficient pressure to prevent the tool from falling from the lower ends of the jaws. Pressure is then exerted on the wedge block 24 by turning the screw 27. This downward pressure causes the outward radial movement of the upper ends of the jaws 16, 17, and 18, which in turn causes a corresponding inward movement of the lower ends of the jaws 16, 17, and 18, so that the jaws in the final action serve as levers using the points of contact between the curved surfaces 22 and the inside of the nut 15 as the fulcrums for the levers.

Thus it will be seen that I effect an initial gripping action by the rotation of the nut 15 and a final leverage action by means of the downward pressure exerted by the wedge block 24 against the upper ends of the jaws 16, 17, and 18, whereby to effect a final vise like gripping action on the tool which is far more effective than any gripping action heretofore known with the use of a chuck.

Having described my invention, what I claim and desire to secure by Letters Patent is:

1. A chuck comprising a hollow body, a plurality of elongated jaws in said body, said jaws being supported for radial and axial movement in said body, a rotatable element for radially moving in one direction the lower ends of said jaws, and means at the other end of said jaws for moving the upper ends of said jaws radially in the opposite direction.

2. A chuck comprising a hollow body, a plurality of elongated jaws supported in said body for axial and radial movement, a rotatable element at one end of said body for radially and axially moving the lower ends of said jaws, and means at the other ends of said jaws for radially moving the upper ends of said jaws, said jaws having arcuate surfaces near the lower ends arranged to contact the said rotatable element, whereby upon radial movement of the upper ends of said jaws a lever action is effected at the lower end with said jaws.

3. The structure of claim 2, in which said hollow body is provided with inwardly extending elements, each having a slot therein arranged to receive one of said jaws.

4. The structure of claim 2, in which said means for radially moving the upper ends of said jaws include a wedge block, and a threaded element rotatable in a threaded opening in said body.

5. The structure of claim 2, in which said means for radially moving the upper ends of said jaws, include an inclined face formed on the upper portion of each of said jaws, a wedge block arranged to contact all of said first named faces, and a threaded element for exerting pressure on said wedge block.

6. The structure of claim 2, in which said means for radially moving the upper ends of said jaws include a rotatable cam having surfaces arranged to contact said jaws, a ring gear on said cam, a pinion for rotating said ring gear, and an element accessible from the exterior of said body for rotating said pinion.

7. A chuck comprising a hollow body, a plurality of elongated jaws supported in said body for axial and radial movement, a rotatable element at one end of said body for radially and axially moving said jaws, and means at the other ends of the said jaws for radially moving the upper ends of said jaws in the opposite direction, said jaws having arcuate surfaces near the lower ends arranged to contact the said rotatable element, whereby upon outward radial movement of the upper ends of said jaws a lever action is effected at the lower end of said jaws, the said hollow body being provided with inwardly extending elements, each having a slot therein arranged to receive one of said jaws.

References Cited in the file of this patent

FOREIGN PATENTS

| Number | Country | Date |
|--------|---------|------|
| 225,830 | Switzerland | 1943 |